(12) United States Patent
Chen

(10) Patent No.: US 11,308,241 B2
(45) Date of Patent: Apr. 19, 2022

(54) SECURITY DATA GENERATION BASED UPON SOFTWARE UNREADABLE REGISTERS

(71) Applicant: INNOGRIT TECHNOLOGIES CO., LTD., Shanghai (CN)

(72) Inventor: Moyang Chen, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 644 days.

(21) Appl. No.: 16/136,237

(22) Filed: Sep. 19, 2018

(65) Prior Publication Data

US 2019/0347445 A1 Nov. 14, 2019

(30) Foreign Application Priority Data

May 14, 2018 (CN) .......................... 201810458094.5

(51) Int. Cl.
*G06F 21/72* (2013.01)
*G06F 21/78* (2013.01)
(Continued)

(52) U.S. Cl.
CPC ................ *G06F 21/72* (2013.01); *G06F 7/58* (2013.01); *G06F 21/78* (2013.01); *H04L 9/0643* (2013.01);
(Continued)

(58) Field of Classification Search
CPC . G06F 21/72; G06F 7/58; G06F 21/78; H04L 9/0643; H04L 9/0822; H04L 9/0825; H04L 9/3247
See application file for complete search history.

(56) References Cited

U.S. PATENT DOCUMENTS 8,393,008 B2 * 3/2013 MacDonald ....... H04N 21/4325
726/30
9,940,444 B1 * 4/2018 Murphy ................ H04L 9/3226
(Continued)

FOREIGN PATENT DOCUMENTS

CN 104618107 A 5/2015
CN 106372540 A 2/2017
(Continued)

OTHER PUBLICATIONS

Pieter Maene et al, Hardware-Based Trusted Computing Architectures for Isolation and Attestation, IEEE (Year: 2018).*
(Continued)

*Primary Examiner* — Shanto Abedin
(74) *Attorney, Agent, or Firm* — Womble Bond Dickinson (US) LLP

(57) ABSTRACT

The present disclosure describes a security device including: a hardware-based data reading circuitry that acquires, through hardware-level interaction, security data source based on a software unreadable register; and a first security data generator that generates first security data based on the security data source. Furthermore, the present disclosure also describes a security device including: a second security data generator that generates second security data; and a hardware-based data writing circuitry that writes, through hardware-level interaction, the second security data into a software unreadable register.

18 Claims, 3 Drawing Sheets

(51) Int. Cl.
  *H04L 9/32* (2006.01)
  *H04L 9/06* (2006.01)
  *G06F 7/58* (2006.01)
  *H04L 9/08* (2006.01)

(52) U.S. Cl.
  CPC .......... *H04L 9/0822* (2013.01); *H04L 9/0825* (2013.01); *H04L 9/3247* (2013.01)

(56) References Cited

U.S. PATENT DOCUMENTS

| | | | |
|---|---|---|---|
| 10,521,618 B1* | 12/2019 | Zhang | G06F 21/76 |
| 2005/0257016 A1* | 11/2005 | Boles | G06F 12/1491 |
| | | | 711/163 |
| 2006/0072762 A1* | 4/2006 | Buer | G06Q 20/3829 |
| | | | 380/277 |
| 2010/0115184 A1* | 5/2010 | Chang | G06F 21/64 |
| | | | 711/103 |
| 2010/0281273 A1* | 11/2010 | Lee | F04B 33/00 |
| | | | 713/190 |
| 2011/0113255 A1* | 5/2011 | Kuster | G06Q 20/40 |
| | | | 713/185 |
| 2012/0102334 A1* | 4/2012 | O'Loughlin | G06F 12/1408 |
| | | | 713/189 |
| 2012/0137137 A1* | 5/2012 | Brickell | G06F 21/572 |
| | | | 713/182 |
| 2012/0201379 A1* | 8/2012 | Fuchs | H04L 9/0897 |
| | | | 380/255 |
| 2013/0047250 A1* | 2/2013 | Kothari | G06F 1/32 |
| | | | 726/16 |
| 2015/0154423 A1* | 6/2015 | Mittal | G06F 21/78 |
| | | | 713/192 |
| 2016/0218875 A1* | 7/2016 | Le Saint | H04L 63/0435 |
| 2016/0357963 A1* | 12/2016 | Sherman | G06F 21/566 |
| 2017/0060779 A1* | 3/2017 | Falk | G06F 12/1416 |
| 2017/0098102 A1* | 4/2017 | Coker | G06F 21/602 |
| 2019/0089534 A1* | 3/2019 | McWilliams | G06F 21/602 |

FOREIGN PATENT DOCUMENTS

| | | |
|---|---|---|
| CN | 106506149 A | 3/2017 |
| CN | 107508679 A | 12/2017 |
| KR | 1020160097593 A | 8/2016 |

OTHER PUBLICATIONS

Kerry, CF, "Digital Signature Standard (DSS)," Federal Information Processing Standards Publication 186-4, Jul. 2013.
Dworkin, M, "NIST SP800-38F Recommendation for Block Cipher Modes of Operation: Methods for Key Wrapping," NIST Special Publication 800-38F, Dec. 2012.
"Advanced Encryption Standard (AES)," Federal Information Processing Standards Publication 197, Nov. 2001.
"FIPS Pub 180-4 Secure Hash Standard (SHS)," Federal Information Processing Standards Publication 180-4, Aug. 2015.
Dworkin, M, "SHA-3 Standard: Permutation-Based Hash and Extendable-Output Functions," ederal Information Processing Standards Publication 202, Aug. 2015.

* cited by examiner

SECURITY DATA GENERATION BASED UPON SOFTWARE UNREADABLE REGISTERS

CROSS REFERENCE TO RELATED APPLICATIONS

The present application is based upon and claims the benefits of a priority of Chinese Patent Application No. 201810458094.5, filed on May 14, 2018, the entire contents of which are incorporated herein by reference.

TECHNICAL FIELD

The present disclosure relates to the technical field of data security, and in particular, to a security device and a security chip.

BACKGROUND

With the rapid developments in the fields of Internet applications, the Internet of Things, and data storage, data security has drawn an increasing attention. More and more chips and embedded systems have functions such as user authentication, key management, data encryption, etc. A variety of controllers and operating systems demand more on data security.

In typical solutions, commonly a microcontroller core is arranged in a security chip and used to control security-related modules such as a random number generator and the likes, through the security specialized bus, so as to perform data interaction with external world. The dedicated security bus is isolated from external system bus, and security-related functions are implemented by Firmware running on Microcontroller Core. The specialized security bus and the security firmware ensure sensitive data being processed and transmitted without exposing to the outside world, so as to ensure confidentiality.

This structure has several disadvantages. For example, it would be quite complicated in terms of the firmware management and upgrade efforts, and it is crucial to protect firmware from being injected with malicious code compromising confidential data by attackers. High costs of hardware and software development and maintenance work will eventually increase the areas and costs of the security chip.

SUMMARY

In one aspect, in general, the present disclosure describes the scheme for a security device and a security chip which would alleviate at least one deficiency mentioned above.

In another aspect, in general, the present disclosure describes a security device comprising: a hardware-based data reading circuitry configured to acquire, through hardware-level interaction, security data source based on a software unreadable register; and a first security data generator configured to generate first security data based on the security data source.

In yet another aspect, in general, the present disclosure describes a security device comprising: a second security data generator configured to generate second security data; and a hardware-based data writing circuitry configured to write, through hardware-level interaction, the second security data into a software unreadable register.

Furthermore, the present disclosure describes a security chip comprising of the security device and the corresponding registers as described above.

This scheme may have one or more following advantages. The security device generates the security data after acquiring the security data source based on the register through hardware-level interaction, and/or writes the security data into the register through hardware-level interaction. Hardware-level interaction is adopted among the security device and related registers to strengthen confidentiality while reducing the maintenance cost of the security device.

Additional features and aspects of the present disclosure will become apparent from the following descriptions of exemplary embodiments with reference to the drawings.

BRIEF DESCRIPTION OF THE DRAWINGS

The drawings, which are incorporated in and constitute part of the specification, together with the description, illustrate exemplary embodiments, features and aspects of the present disclosure and serve to explain the principles of the present disclosure.

DETAILED DESCRIPTION OF EMBODIMENTS

Figure 1:
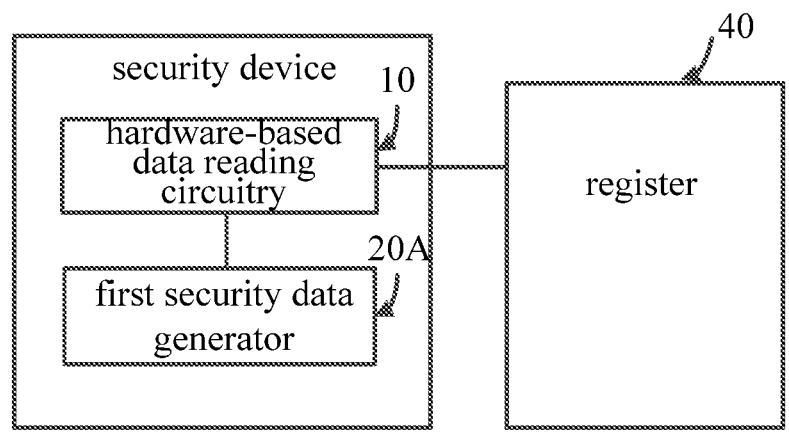
FIG. 1 shows a block diagram of an example security device according to an embodiment of the present disclosure.

Various exemplary embodiment, features and aspects of the present disclosure will be described in detail with reference to the drawings. The same reference numerals in the drawings represent elements having the same or similar functions. Although various aspects of the embodiments are shown in the drawings, the drawings are not necessarily drawn in proportion, unless otherwise specified.

Herein the term "exemplary" means "used as an instance or embodiment, or explanatory". Any embodiment described as "exemplary" here is not necessarily construed as being superior to or better than other embodiments.

Numerous details are given in the following embodiments for the purpose of better explanation on the present disclosure. One skilled in the art may understand that the present disclosure can still be realized even without some of those details. Methods, means, elements and circuits that are well known to a person skilled in the art are not described in detail so that the principle of the present disclosure becomes apparent.

FIG. 1 shows a block diagram of an example security device according to an embodiment of the present disclosure. As shown in FIG. 1, the device comprises a hardware-based data reading circuitry 10 and a first security data generator 20A. The hardware-based data reading circuitry 10 is configured to acquire, through hardware-level interaction, security data source based on the software unreadable register 40. The first security data generator 20A is configured to generate first security data based on the security data source.

Figure 2:
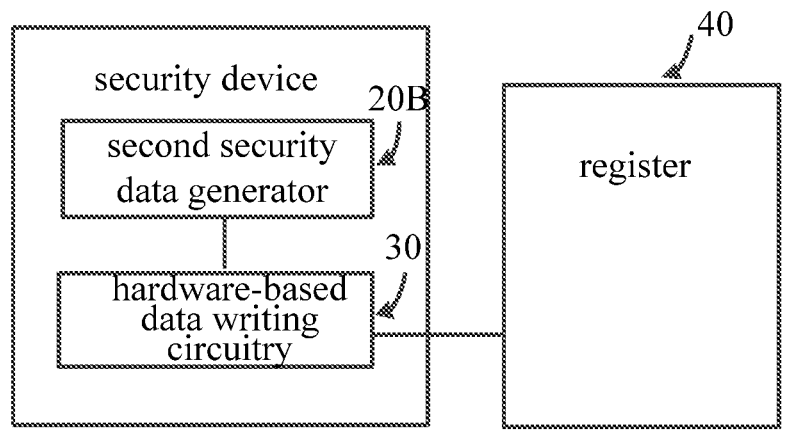
FIG. 2 shows a block diagram of an example security device according to an embodiment of the present disclosure.

FIG. 2 shows a block diagram of another example security device according to an embodiment of the present disclosure. As shown in FIG. 2, the device comprises a second security data generator 20B and a hardware-based data writing circuitry 30. The second security data generator 20B is configured to generate second security data. The hardware-based data writing circuitry 30 is configured to write, through hardware-level interaction, the second security data into the software unreadable register 40.

In one embodiment, the register 40 can be set as a software unreadable register by means of one-time programming. Reading operation and/or writing operation can be performed on the register 40 through hardware. For example, the register may connect with the security device by its own hardware interface. Through hardware interface, the hardware-based data reading circuitry 10 acquires the security data source based on the register, and/or the hardware-based data writing circuitry 30 writes the second security data into the register. A hardware clear operation can be performed on the register 40 to completely clear the security information. The size of register 40 is based on the requirements of security level. For example, a register 40 of the size of 256 bits can deliver 256 bits security level.

There can be one or more registers 40, and the number of the registers 40 may be set as needed. When there are a plurality of registers 40, the hardware-based data reading circuitry 10 and/or the hardware-based data writing circuitry 30 may choose a certain register to operate through hardware-level interaction. For example, the hardware-based data reading circuitry 10 may acquire security data source based on certain registers 40 through hardware interface of the registers 40.

The first security data generator 20A can be used to generate the first security data based on the security data source read from the register 40. For example, the first security data generator 20A can perform encryption on the security data source to generate encrypted data, perform decryption on the security data source to generate decrypted data, perform hash operation on the security data source to generate a hash value, perform digital signature processing on the security data source to generate a digital signature, etc. There is no restriction on either the first security data generator 20A or the first security data.

The second security data generator 20B can be used to generate the second security data which is written into the register 40 through hardware-level interaction by the hardware-based data writing circuitry 30 later. For example, the second security data generator 20B can perform hash operation on the data imported externally to generate a hash value, generate a random number, etc. There is no restriction on either the second security data generator 20B or the second security data In the present embodiment, the security device shown in FIG. 1 generates the first security data after acquiring the security data source based on the register through hardware-level interaction, and the security device shown in FIG. 2 writes the second security data into the register through hardware-level interaction. Hardware-level interaction is adopted between the security devices and the register to strengthen the security of data while reducing the maintenance cost of the security device.

Figure 3:
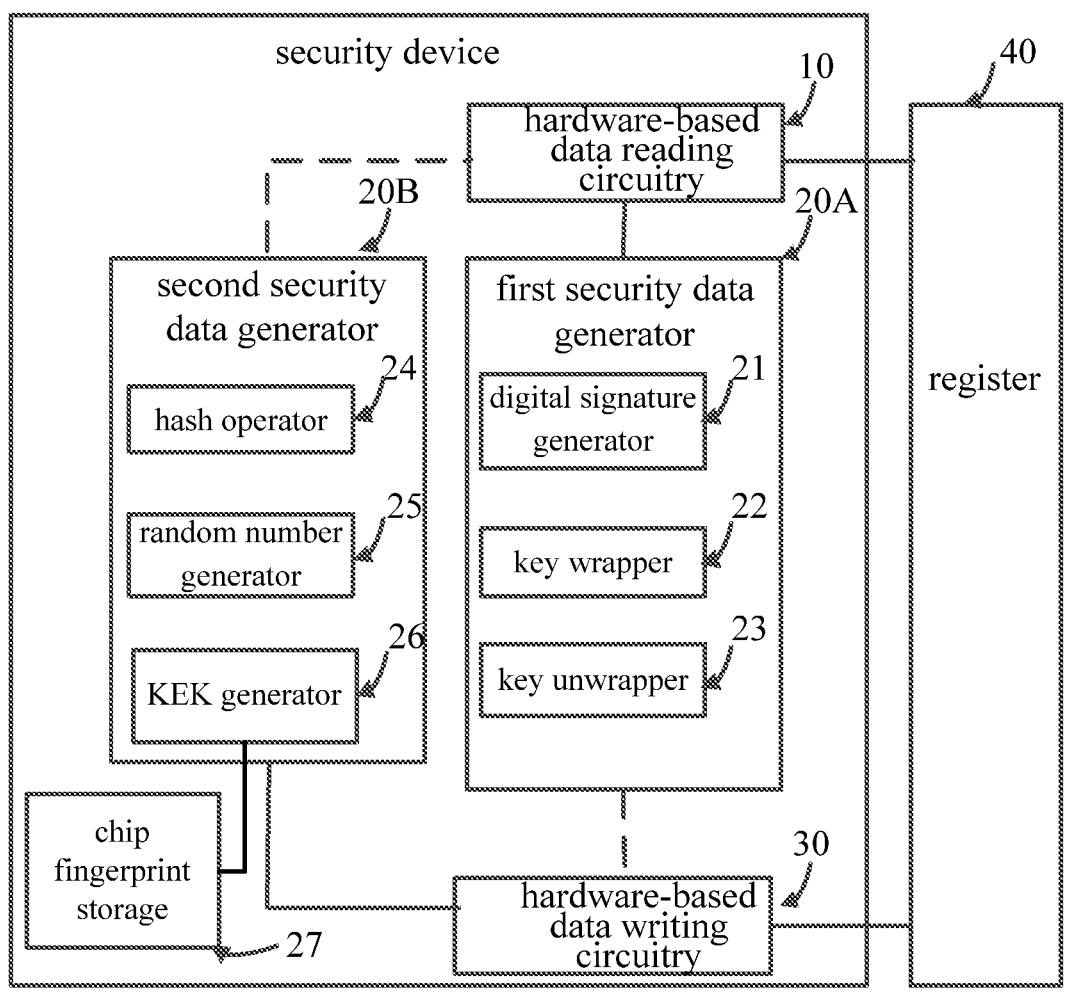
FIG. 3 shows a block diagram of an example security device according to an embodiment of the present disclosure.

FIG. 3 shows a block diagram of yet another example security device according to an embodiment of the present disclosure. As shown in FIG. 3, the security device comprises the hardware-based data reading circuitry 10, the first security data generator 20A, the second security data generator 20B, and the hardware-based data writing circuitry 30. The hardware-based data reading circuitry 10 is configured to acquire, through hardware-level interaction, security data source based on the software unreadable register 40. The first security data generator 20A is configured to generate first security data based on the security data source.

The second security data generator 20B is configured to generate second security data. The hardware-based data writing circuitry 30 is configured to write, through hardware-level interaction, the second security data into the software unreadable register 40.

As shown by the dash line between the hardware-based data reading circuitry 10 and the second security data generator 20B as well as that between the first security data generator 20A and hardware-based data writing circuitry 30, depending on the specific functions of the first security data generator 20A and the second security data generator 20B, the first security data generator 20A can be coupled with the hardware-based data writing circuitry 30, and the second security data generator 20B can be coupled with the hardware-based data reading circuitry 10.

The first security data generator 20A can comprise one or more of a digital signature generator 21, a key wrapper 22, and a key unwrapper 23. The second security data generator 20B can comprise one or more of a hash operator 24, a random number generator 25, and a KEK (Key Encryption Key) generator 26.

In one possible implement, the security data source comprises data that is signed, and the first security data generator 20A comprises the digital signature generator 21 configured to generate a digital signature based on a private key and the data that is signed. The private key can be imported externally or acquired from the register together the data that is signed. In one embodiment, the hardware-based data reading circuitry 10 may obtain the private key and the data that is signed respectively from different registers, through hardware-level interaction. The private key and the data that is signed can also be obtained from the same register through hardware-level interaction.

The digital signature generator 21 may adopt any digital signature generation solutions, including that complying with the standard "Digital Signature Standard (DSS)" (FIPS PUB 186-4) issued on July 2013. For example, the digital signature generator 21 can adopt the Elliptic Curve Digital Signature Algorithm (ECDSA) and generate the digital signature based on the private key and the data that is signed.

The generated digital signature can be exported to an external device or written back into the register 40. In a case where the digital signature needs to be written into the register, the digital signature generator 21 is coupled with the hardware-based data writing circuitry 30, and the hardware-based data writing circuitry 30 writes the digital signature into the register 40 through hardware-level interaction. In one embodiment, when there are a plurality of registers 40, the hardware-based data writing circuitry 30 can write the generated digital signature into a certain register 40 through hardware-level interaction.

The security device comprising the digital signature generator 21, the hardware-based data reading circuitry 10, and optionally the hardware-based data writing circuitry 30 is a digital signature device. In the embodiment, the hardware-based data reading circuitry 10 can acquire the data that is signed based on the register through hardware-level interaction, and the digital signature generator 21 can generate the digital signature based on the private key and the data that is signed. Optionally, the hardware-based data writing circuitry 30 can write the generated digital signature into the register through hardware-level interaction.

In one embodiment, the security data source comprises a plaintext DEK (Data Encryption Key) and KEK (Key Encryption Key), and the first security data generator 20A comprises a key wrapper 22 configured to encrypt the plaintext DEK by using the KEK to generate an encrypted DEK. In another embodiment, the security data source comprises the KEK, and the first security data generator 20A comprises a key unwrapper 23 configured to decrypt the encrypted DEK by using the KEK to generate the plaintext DEK.

In one embodiment, the plaintext DEK may comprise the key used to encrypt the data. The plaintext DEK becomes the encrypted DEK after being encrypted with KEK. The KEK may comprise the key used to encrypt the plaintext DEK, and be generated by the KEK generator 26 described later. The plaintext DEK and KEK are stored in the software unreadable register 40, so as to strengthen the security of the keys.

The key wrapper 22 and key unwrapper 23 may adopt any key wrapping/unwrapping solutions, including that complying with the standard "NIST SP800-38F Recommendation for Block Cipher Modes of Operation: Methods for Key Wrapping" issued on December 2012 and "ADVANCED ENCRYPTION STANDARD (AES)" (FIPS PUB 197) issued on November 2001. The encrypted DEK generated by the key wrapper 22 can be exported to an external device. The plaintext DEK generated by the key unwrapper 23 can be exported to a block cipher unit (not illustrated in the figures) for use in the encryption and decryption of the data block, or written back into the register 40. In a case where the plaintext DEK needs to be written into the register, the key unwrapper 23 is coupled with the hardware-based data writing circuitry 30, and the hardware-based data writing circuitry 30 writes the plaintext DEK into the register 40 through hardware-level interaction.

In the embodiment, the key wrapper 22 is configured to generate the encrypted DEK based on the plaintext DEK and KEK obtained from the register through hardware-level interaction, and the key unwrapper 23 is configured to generate the plaintext DEK based on the KEK obtained from the register through hardware-level interaction. Optionally, the hardware-based data writing circuitry 30 can write the generated plaintext DEK into the register through hardware-level interaction. The manner of hardware-level interaction with the register can strengthen the security of the plaintext DEK and the KEK.

In one embodiment, the second second security data comprises a hash value, and the second security data generator 20B comprises the hash operator 24 configured to generate the hash value based on an imported message by a hash operation. The message can be imported externally or acquired based on the register 40. In a case where the hash operator 24 acquires the message from the register 40, the hash operator 24 is coupled with the hardware-based data reading circuitry 10, and the hardware-based data reading circuitry 10 acquires the message based on the register through hardware-level interaction and forwards the message to the hash operator 24.

The hash operator 24 can support any hash operation, including that complying with the standards "FIPS PUB 180-4 Secure Hash Standard (SHS)" issued on August 2015 and "SHA-3 Standard: Permutation-Based Hash and Extendable-Output Functions" (FIPS PUB 202) issued on August 2015. For example, the hash operator 24 may map the message, such as a byte sequence, into a fixed-length bit sequence, e.g., 256 bits Message Digest (Hash Value).

The hardware-based data writing circuitry 30 is configured to write the hash value into the register 40 through hardware-level interaction. In one embodiment, when there are a plurality of registers 40, the hardware-based data writing circuitry 30 can write the generated hash value into a specified register 40 through hardware-level interaction.

The security device comprising the hash operator 24, the hardware-based data writing circuitry 30, and optionally the hardware-based data reading circuitry 10 is a hash operation device. For example, the hash operation device can be used for user authentication. In the user authentication, the hash operation device generates a hash value based on the message such as a password and a user name, and compares that hash value with the one generated during the user registration. If the two hash values are equal, the user authentication succeeds; and if not, the user authentication fails.

The hash operation device may allow software to invoke it multiple times to obtain a hash value of a message of arbitrary length, and meanwhile the hash operation device can support an XOR operation of the generated hash value and the value stored in the designated register and then the writing of the result into another register.

In the present embodiment, the hardware-based data writing circuitry 30 can write the generated hash value into the register through hardware-level interaction. Writing operation on the register can only be performed through hardware-level interaction, while the register is software unreadable, which strengthens the confidentiality of the hash value.

In one embodiment, the second security data comprises a random number, and the second security data generator 20B comprises the random number generator 25 configured to generate the random number. The hardware-based data writing circuitry 30 is configured to write the random number into the register 40 through hardware-level interaction. The random number generator 25 may comprise a true random number generator. In the embodiment, the manner of hardware-level interaction with the register can strengthen the security of the generated random number.

In one embodiment, the second security data comprises the KEK, and the second security data generator 20B comprises the KEK generator 26 configured to generate the KEK. The security device further comprises a chip fingerprint storage 27 storing a chip fingerprint of a chip on which the security device is located and accessible to the KEK generator 26 only. The chip fingerprint may include 256 bits. The KEK generator 26 is coupled with and capable of accessing the chip fingerprint storage 27, acquires the chip fingerprint from the chip fingerprint storage 27, and generates the KEK based on the chip fingerprint.

In one embodiment, the KEK is synthesized by the value stored in the register 40 and the chip fingerprint. For example, the KEK may be synthesized by an XOR operation on the value stored in the register 40 and the chip fingerprint. In the embodiment, the hardware-based data writing circuitry 30 writes the KEK generated by the KEK generator 26 into the register through hardware-level interaction. The register strengthens the confidentiality of the KEK.

Figure 4:
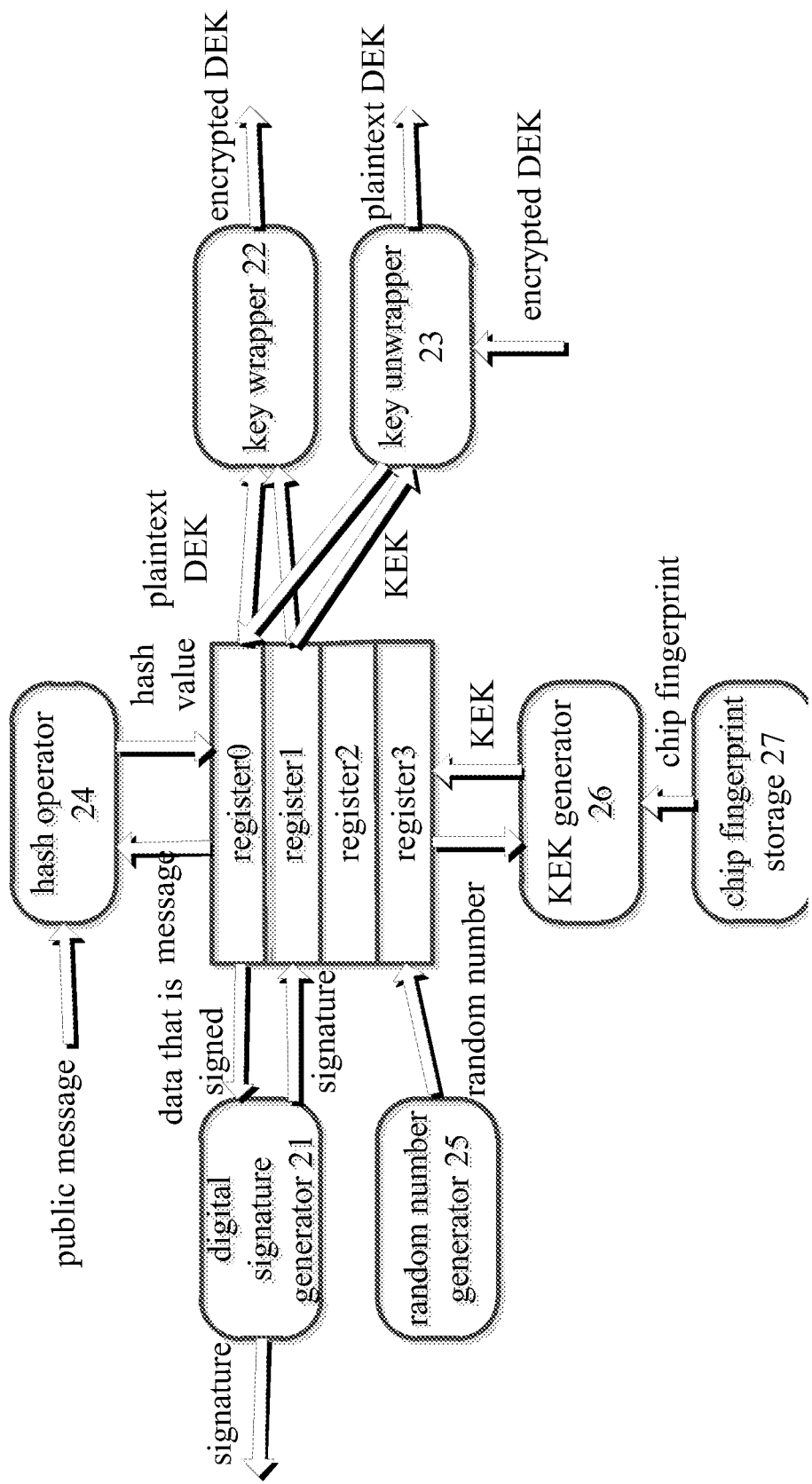
FIG. 4 shows a block diagram of an example security chip according to an embodiment of the present disclosure.

FIG. 4 shows a block diagram of a security chip according to an embodiment of the present disclosure. As shown in FIG. 4, the security chip comprises the register 40 and the security device, and the security device may comprise one or more of the digital signature generator 21, the key wrapper 22, the key unwrapper 23, the hash operator 24, the random number generator 25, the KEK generator 26, and the chip fingerprint storage 27. For simplifying the illustration and description, the hardware-based data reading circuitry 10 and the hardware-based data writing circuitry 30 are omitted in the figure and also in the following description.

As shown in FIG. 4, the digital signature generator 21 can acquire the data that is signed based on the register 40, and export the generated digital signature to the external device or write the signature back into the register 40. The key wrapper 22 can acquire the plaintext DEK and KEK based on the register 40, and export the encrypted DEK to the external device. The key unwrapper 23 can acquire the KEK based on the register 40 and the encrypted DEK externally, and export the plaintext DEK to the external device or write the DEK back into the register 40. The hash operator 24 can generate the hash value based on the public message imported externally or the message acquired from the register 40, and write the hash value into the register 40. The random number generator 25 can write the generated random number into the register 40. The KEK generator 26 can generate the KEK based on the chip fingerprint acquired from the chip fingerprint storage 27 and optionally the information acquired based on the register 40, and write the KEK into the register 40.

In one embodiment, the security chip may include a register bank comprising a plurality of registers 40. For example, the security chip may include a register bank comprising four 256-bit registers 40, which are respectively shown as register0, register1, register2, and register3 in the figure.

In one embodiment, the security chip can be used to import confidential information. A random number A can be generated by the random number generator 25 in the security chip as a private key, and stored in the register 40. The digital signature generator 21 can calculate a public key value based on the private key. The random number generator 25 can generate another random number B. The security chip has the public key value and the random number B published. Users can encrypt confidential information M to be sent based on the public key value and the random number B, to obtain information ciphertext N. The information ciphertext N is sent to the security chip. The digital signature generator 21 in the security chip can decrypt the information ciphertext N based on the random number A and the random number B, and thereafter obtain the confidential information M. The confidential information M is stored in the register 40 in the security chip for subsequent operations.

In the embodiment, the security chip comprises the register and the security device. The register is software unreadable, which, in terms of hardware, makes the security data in the security chip not leak. A dedicated microcontroller and a security system bus in the security chip become unnecessary, so that the costs in production and maintenance of the security chip can be reduced.

The descriptions of the various examples have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

What is claimed is:

1. A security device comprising:
    a hardware-based data reading circuitry connected with a software unreadable register, wherein the hardware-based data reading circuitry is to acquire, through hardware-level interaction, security data source based on the software unreadable register, wherein a size of the register is configured based on a security level associated with the security data source, and wherein the software unreadable register can only be read or written through the hardware-level interaction;
    a first security data generator coupled with the hardware-based data reading circuitry to generate first security data based on the security data source including a digital signature and a plaintext Data Encryption Key (DEK), wherein the first security data generator includes a digital signature generator to generate the digital signature, a key wrapper to encrypt the plaintext DEK, and a key unwrapper coupled with a hardware-based data writing circuitry to decrypt an encrypted DEK; and
    a second security data generator configured to generate second security data, wherein the hardware-based data writing circuitry is configured to write, through the hardware-level interaction, the second security data into the software unreadable register.

2. The device according to claim 1, wherein the second security data comprises a hash value, the second security data generator comprises a hash operator configured to generate the hash value based on an imported message by a hash operation, the hardware-based data writing circuitry is configured to write the hash value into the register through hardware-level interaction.

3. The device according to claim 2, wherein the hardware-based data reading circuitry is configured to acquire, through hardware-level interaction, the message based on the register, the hash operator is configured to generate the hash value based on the message acquired by the hardware-based data reading circuitry.

4. The device according to claim 1, wherein the security data source comprises data that is signed, the first security data generator comprises the digital signature generator configured to generate the digital signature based on a private key and the data that is signed.

5. The device according to claim 4, further comprising a hardware-based data writing circuitry configured to write, through hardware-level interaction, the digital signature into the register.

6. The device according to claim 1, wherein the security data source comprises a plaintext DEK and a Key Encryption Key (KEK), wherein the first security data generator comprises the key wrapper to encrypt the plaintext DEK by using the KEK to generate an encrypted DEK.

7. The device according to claim 1, wherein the security data source comprises a KEK, the first security data generator comprises the key unwrapper configured to decrypt an encrypted DEK by using the KEK to generate a plaintext DEK.

8. The device according to claim 7, further comprising a hardware-based data writing circuitry configured to write, through hardware-level interaction, the plaintext DEK into the register.

9. The device according to claim 1, wherein the second security data comprises a random number, the second security data generator comprises a random number generator configured to generate the random number, the hardware-based data writing circuitry is configured to write the random number into the register through hardware-level interaction.

10. The device according to claim 1, further comprising a chip fingerprint storage storing a chip fingerprint of a chip on which the security device is located, and accessible to the second security data generator only.

11. The device according to claim 10, wherein the second security data comprises a KEK (Key Encryption Key), the second security data generator comprises a KEK generator capable of accessing the chip fingerprint storage and configured to generate the KEK based on the chip fingerprint, the hardware-based data writing circuitry is configured to write the KEK into the register through hardware-level interaction.

12. The device according to claim 11, further comprising the hardware-based data reading circuitry configured to acquire, through hardware-level interaction, a value based on the register,
the KEK generator is configured to generate the KEK based on the value acquired by the hardware-based data reading circuitry and the chip fingerprint.

13. The device according to claim 1, wherein the hardware-based data reading circuitry is configured to acquire the security data source based on the register through a hardware interface of the register.

14. The device according to claim 1, wherein the hardware-based data writing circuitry is configured to write the second security data into the register through a hardware interface of the register.

15. A security chip comprising:
a security device comprising:
a hardware-based data reading circuitry connected with a software unreadable register, wherein the hardware-based data reading circuitry is to acquire, through hardware-level interaction, security data source based on the software unreadable register, wherein a size of the register is based on a security level associated with the security data source, and wherein the software unreadable register can only be read or written through the hardware-level interaction;
a first security data generator coupled with the hardware-based data reading circuitry to generate first security data based on the security data source including a digital signature and a plaintext Data Encryption Key (DEK), wherein the first security data generator includes a digital signature generator to generate the digital signature, a key wrapper to encrypt the plaintext DEK, and a key unwrapper coupled with a hardware-based data writing circuitry to decrypt an encrypted DEK; and
a second security data generator configured to generate second security data, wherein the hardware-based data writing circuitry is configured to write, through the hardware-level interaction, the second security data into the software unreadable register.

16. The security chip according to claim 15, wherein the register comprises four or more registers.

17. The security chip according to claim 15, wherein the register comprises four or more registers.

18. A method comprising:
acquiring, by a hardware-based data reading circuitry through hardware-level interaction, security data source based on a software unreadable register, wherein a size of the register is based on a security level associated with the security data source, and wherein the software unreadable register can only be read and written through the hardware-level interaction; and
generating, by a first security data generator, first security data based on the security data source including a digital signature and a plaintext Data Encryption Key (DEK), wherein the first security data generator includes a digital signature generator to generate the digital signature, a key wrapper to encrypt the plaintext DEK, and a key unwrapper coupled with a hardware-based data writing circuitry to decrypt an encrypted DEK, wherein the hardware-based data writing circuitry is configured to write, through the hardware-level interaction, a second security data into the software unreadable register, wherein a second security data generator is configured to generate the second security data.

* * * * *